(12) United States Patent
Lombardi et al.

(10) Patent No.: US 12,381,905 B2
(45) Date of Patent: Aug. 5, 2025

(54) REMEDIATION RESPONSIVE TO A PATTERN OF ALERTS

(71) Applicant: BlackBerry Limited, Waterloo (CA)

(72) Inventors: Robert Joseph Lombardi, Kitchener (CA); Jeffrey D. Williams, Stouffville (CA)

(73) Assignee: BlackBerry Limited, Waterloo (CA)

( * ) Notice: Subject to any disclaimer, the term of this patent is extended or adjusted under 35 U.S.C. 154(b) by 189 days.

(21) Appl. No.: 18/340,068

(22) Filed: Jun. 23, 2023

(65) Prior Publication Data

US 2024/0430296 A1 Dec. 26, 2024

(51) Int. Cl.
*H04L 9/40* (2022.01)

(52) U.S. Cl.
CPC .......... *H04L 63/1441* (2013.01); *H04L 63/20* (2013.01)

(58) Field of Classification Search
CPC ............................ H04L 63/1441; H04L 63/20
See application file for complete search history.

(56) References Cited

U.S. PATENT DOCUMENTS

| | | | |
|---|---|---|---|
| 10,678,602 B2 | 6/2020 | Manglik et al. | |
| 11,397,808 B1 * | 7/2022 | Prabhu | G06F 21/566 |
| 11,501,234 B2 | 11/2022 | Ray et al. | |
| 2019/0124097 A1 | 4/2019 | Thomas et al. | |
| 2019/0124104 A1 | 4/2019 | Apostolopoulos | |
| 2019/0258800 A1 | 8/2019 | Ladnai et al. | |
| 2019/0260782 A1 * | 8/2019 | Humphrey | H04L 51/42 |
| 2023/0325292 A1 * | 10/2023 | Ardel | G05B 23/0254 |
| 2023/0344860 A1 * | 10/2023 | Agranonik | G06N 5/01 |

FOREIGN PATENT DOCUMENTS

| | | |
|---|---|---|
| EP | 1834439 B1 | 11/2013 |
| WO | 2023/059938 A1 | 4/2023 |

OTHER PUBLICATIONS

European Patent Office, Extended European Search Report for Appl. No. 24183782.2 dated Nov. 25, 2024 (9 pages).
Sakthivelu U. et al., "Advanced Persistent Threat Detection and Mitigation Using Machine Learning Model," Intelligent Automation and Soft Computing, vol. 36, No. 3, Dec. 6, 2022 (17 pages).
1 of 4—Rafferty, Laura, "Agent-Based Modeling Framework for Adaptive Cyber Defence of the Internet of Things," Dec. 1, 2022, pp. 1-35.

(Continued)

*Primary Examiner* — Oleg Korsak
(74) *Attorney, Agent, or Firm* — Trop Pruner & Hu, P.C.

(57) ABSTRACT

In some examples, a system detects a first alert associated with activities of a first group of entities, the first alert generated by a first type of security agent. The system predicts an alert collection including one or more alerts expected to occur based on occurrence of the first alert, wherein a second alert of the alert collection is from a second type of security agent different from the first type of security agent. The system generates one or more remediation actions to apply in response to a pattern of alerts including the first alert and the one or more alerts of the alert collection. The system provides, in an electronic device to be protected against attacks, information of the one or more remediation actions to be applied by the electronic device responsive to occurrence of the pattern of alerts.

20 Claims, 5 Drawing Sheets

(56) References Cited

OTHER PUBLICATIONS 2 of 4—Rafferty, Laura, "Agent-Based Modeling Framework for Adaptive Cyber Defence of the Internet of Things," Dec. 1, 2022, pp. 36-79.
3 of 4—Rafferty, Laura, "Agent-Based Modeling Framework for Adaptive Cyber Defence of the Internet of Things," Dec. 1, 2022, pp. 80-120.
4 of 4—Rafferty, Laura, "Agent-Based Modeling Framework for Adaptive Cyber Defence of the Internet of Things," Dec. 1, 2022, pp. 121-155.
Albasheer et al., Cyber-Attack Prediction Based on Network Intrusion Detection Systems for Alert Correlation Techniques: A Survey, Sensors 2022 (15 pages).
Jon Baker, Attack Flow—Beyond Atomic Behaviors, Mar. 2, 2022 (18 pages).
Ghafir et al., Hidden Markov Models and Alert Correlations for the Prediction of Advanced Persistent Threats, IEEE Access, vol. 7, 2019 (13 pages).
New Relic, Accelerate Incident Response with AIOps downloaded May 26, 2023 (18 pages).
Servicenow, AIOps done differently downloaded May 26, 2023 (5 pages).
Zhao et al., Automatically Predicting Cyber Attack Preference with Attributed Heterogeneous Attention Networks and Transductive Learning, 2020 (14 pages).
Abie et al., Adaptive Security and Trust Management for Autonomous Messaging Systems, Mar. 4, 2022 (31 pages).
Kesavan et al., Blog/Engineering, Introducing Adaptive Metrics: A new costmanagement feature in Grafana Cloud, May 9, 2023 (12 pages).
Vert et al., Adaptive Security Metrics for Computer Systems downloaded May 16, 2023 (6 pages).
Blackberry Limited, Cylance Endpoint Security downloaded Apr. 19, 2023 (3 pages).
Blackberry Limited, Cylance Endpoint Security, Overview and Architecture Guide, downloaded Apr. 19, 2023 (32 pages).
Blackberry Limited, How XDR Works downloaded Apr. 19, 2023 (5 pages).
Blackberry Limited, MDR vs XDR: What's the Difference? downloaded Apr. 19, 2023 (4 pages).
Blackberry Limited, Extended Detection and Response (XDR) downloaded Apr. 19, 2023 (7 pages).
Lombardi et al., U.S. Appl. No. 18/332,554 entitled Remediation for an Entity Outside a Scope of an Alert filed Jun. 9, 2023 (32 pages).
Lombardi et al., U.S. Appl. No. 18/332,550 entitled Adaptive Data Collection for Alerts filed Jun. 9, 2023 (48 pages).
European Patent Office, Extended European Search Report for Appl. No. 24180627.2 dated Sep. 30, 2024 (7 pages).
European Patent Office, Extended European Search Report for Appl. No. 24180625.6 dated Sep. 30, 2024 (8 pages).

* cited by examiner

REMEDIATION RESPONSIVE TO A PATTERN OF ALERTS

BACKGROUND

Electronic devices may experience various security issues that can result in malfunctioning of the electronic devices or loss or theft of data. For example, electronic devices may be targets of attacks by various malicious entities, including humans, programs (e.g., viruses, worms, ransomware, etc.), and/or machines. Other types of security issues that may be experienced by electronic devices include electronic devices visiting potentially malicious or infected online resources (e.g., websites with low reputation scores, certain social media sites, etc.), electronic devices communicating sensitive data in an insecure manner or with an unauthorized entity, electronic devices accessing a program on an unknown network, electronic devices updating a program or failing to update a program to a specific version, and so forth.

BRIEF DESCRIPTION OF THE DRAWINGS

Some implementations of the present disclosure are described with respect to the following figures.

Figure 1:
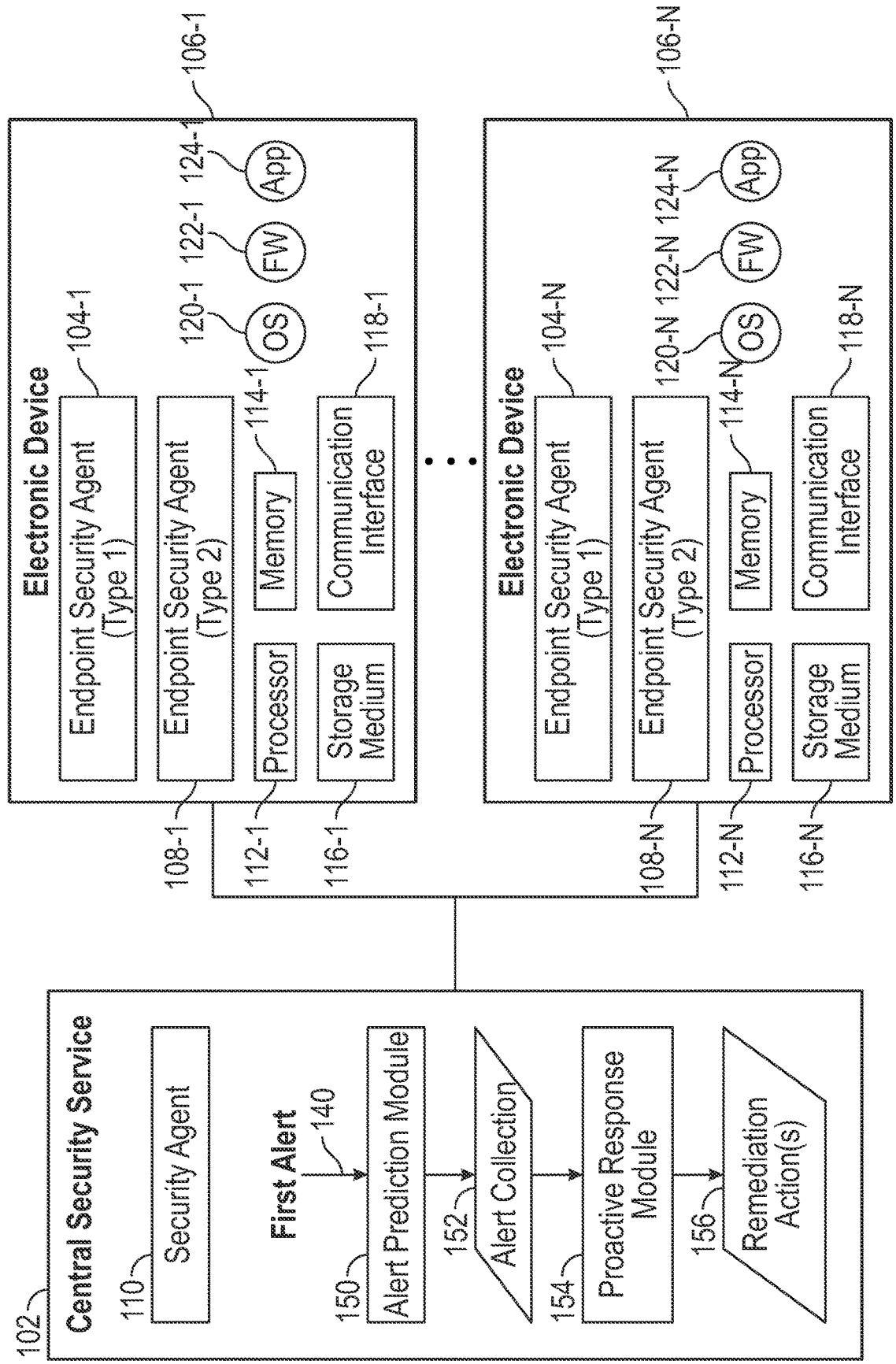
FIG. 1 is a block diagram of an example arrangement that includes a central security service coupled to various electronic devices, according to some implementations of the present disclosure.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Security systems can generate alerts in response to detected events that are indicative of potential security issues. In some cases, a security system can include endpoint security mechanisms that are part of electronic devices. The endpoint security mechanisms are run locally in respective electronic devices to detect events that are indicative of potential security issues. Examples of endpoint security mechanisms can include malware scanners that are able to detect presence of malware (e.g., viruses, worms, ransomware, etc.), user and entity behavior analytics (UEBA) mechanisms to detect anomalies in behaviors of users or other entities, lateral movement detectors, and so forth.

In some cases, the security system can further include one or more security mechanisms implemented in a central security service, such as in a cloud, at a server, or any other centralized location that allows the central security service to interact with multiple electronic devices. The various security mechanisms implemented in electronic devices and in a central security service can include different types of security mechanisms configured to provide different types of protection against attacks.

An alert may be generated by a security system due to operations in an electronic device, where the operations can include activities associated with one or more entities in the electronic device. Entities can include any or some combination of processes, objects, resources, users, and so forth.

A "process" can refer to program (including machine-readable instructions) under execution in the electronic device. A process in the electronic device can cause execution of another process in the electronic device (or in another electronic device).

Additionally, a process can create or modify an object in the electronic device. An "object" can refer to an artifact, configuration information, a network connection, a scheduled task such as in a queue, or a call of an application programming interface (API) or a library, a user account, as examples.

An artifact can refer to a file, a database, or any other type of data that is created or modified (updated or deleted) as part of the operation of a process. Configuration information relates to a configuration of the electronic device or a component in the electronic device. In an example, a registry, such as associated with an operating system (OS) of the electronic device), can include configuration information related to settings, options, or other values for hardware and software components in the electronic device. A process can create a registry or modify a registry. A registry can include multiple registry entries relating to different settings, options, or other values for hardware and software.

A process can also establish, modify, or tear down a network connection. Additionally, a process can add a scheduled task to a queue, or make a call to an API or a library.

A resource can refer to a website, a domain name system (DNS) server, or any other type of resource accessible by an electronic device. A file may be downloaded from a website. A process may interact with a website. An electronic device may interact with a DNS server to obtain an Internet Protocol (IP) address associated with a domain name. There are many other examples of resources that an electronic device can interact with.

As alerts are generated, remediation actions can be taken to address the alerts. A security system can collect various data relating to operations of an electronic device for analysis to determine whether an attack is occurring (or is likely to occur), and what if any remediation actions to take for an alert. An alert provides an indication that an issue has been detected that potentially may be indicative of an attack occurring in the electronic device. In some examples, a collection of data may be triggered by the occurrence of one or more alerts. The collection of data triggered by one or more alerts may be in addition to data collected in the electronic device as part of operations of the electronic device.

Performing remediation actions in response to alerts is reactive in nature. By the time a remediation action is taken as a reaction to an alert, an attack may have progressed to a point where damage has occurred in an electronic device or data has been accessed by an unauthorized attacker, which can be a human, a program, or a machine.

In accordance with some implementations of the present disclosure, a proactive security system is provided that is able to respond to a detected alert by predicting a collection of one or more further alerts. The proactive security system uses the prediction to generate one or more remediation actions to apply. The proactive security system is able to take preventative or proactive remediation actions based upon the predicted collection of one or more further alerts. The preventative or proactive remediation action provides for enhanced protection of electronic devices from attacks, to prevent malfunctioning of the electronic devices or loss or theft of data in the electronic devices.

FIG. 1 is a block diagram of an example arrangement that includes a proactive security system to protect various electronic devices 106-1 to 106-N. The proactive security system includes a central security service 102 and endpoint security agents 104-1 to 104-N and 108-1 to 108-N (N≥1) included in respective electronic devices 106-1 to 106-N.

Examples of electronic devices include any or some combination of the following: desktop computers, notebook computers, tablet computers, server computers, smartphones, Internet-of-Things (IoT) devices, household appliances, game appliances, vehicles or vehicle controllers, storage systems, communication nodes, and so forth. The electronic devices 106-1 to 106-N may be located in a network of an enterprise, for example. An "enterprise" can refer to a business concern, an education organization, a government agency, an individual, any group of users, or any other organization. The enterprise network can include a local area network (LAN), a wide area network (WAN), and so forth. Some electronic devices may be coupled to the enterprise network over a public network, such as the Internet.

The endpoint security agents 104-1 to 104-N and 108-1 to 108-N run locally in the electronic devices 106-1 to 106-N to detect events that are indicative of potential security issues. An "agent" can refer to a software module executed on a hardware processing circuit, which can include any or some combination of a microprocessor, a core of a multi-core microprocessor, a microcontroller, a programmable integrated circuit, a programmable gate array, or another hardware processing circuit.

In the example of FIG. 1, the endpoint security agents 104-1 to 104-N and 108-1 to 108-N can interact with the central security service 102 to enable the central security service 102 to provide protection for multiple electronic devices. A "central" security service can refer to any service that is able to interact with one or more electronic devices to provide security services to protect the one or more electronic devices against an attack. The central security service can be provided in a cloud, at a server, or any other centralized location that allows the central security service to interact with multiple electronic devices.

In each electronic device, an endpoint security agent 104-*i* (i=1 to N) can be of a different type than a respective endpoint security agent 108-*i*. Although just two different types of endpoint security agents are shown in each electronic device 106-*i*, in other examples, there can be more than two different types of endpoint security agents included in an electronic device. In further examples, an electronic device can include just one endpoint security agent.

Examples of different types of endpoint security agents can include any or some combination of the following: a security agent that detects and blocks malware using specified rules or using machine learning to detect existing malware as well as new malware or new variants of existing malware; a security agent that monitors and aggregates collected information to detect, track, and respond to malicious events; an information protection agent that detects when sensitive data is being accessed or is being sent to an external target; and so forth.

A security agent 110 can also be part of the central security service 102. The security agent 110 in the central security service 102 can provide protection based on information across multiple electronic devices, such as the electronic devices 106-1 to 106-N, as well as information from other sources in a network or external of the network. The security agent 110 is a type of security agent that is different form the endpoint security agents 104-1 to 104-N and 180-1 to 108-N.

In accordance with some implementations of the present disclosure, the central security service 102 further includes an alert prediction module 150 and a proactive response module 154. Each of the modules 150 and 154 can be implemented using machine-readable instructions that are part of the central security service 102. Although shown as two modules, the alert prediction module 150 and the proactive response module 154 can be integrated into one module in other examples.

The alert prediction module 150 is able to predict a collection of alerts (hereinafter referred to as an "alert collection") based on detecting one or more alerts. The alert collection can include one or more alerts. For example, the alert prediction module 150 can detect a first alert 140 associated with activities of a first group of entities in one or more of the electronic devices 106-1 to 106-N. In some examples, the first alert 140 may be generated by a first type of security agent, e.g., any of endpoint security agents 104-1 to 104-N and 108-1 to 108-N.

Based on the detected first alert 140, the alert prediction module 150 predicts an alert collection 152 that includes one or more predicted alerts. The alert collection 152 predicted by the alert prediction module 150 can include a second alert that is expected to be generated by a second type of security agent that is different from the first type of security agent.

The alert collection 152 is provided by the alert prediction module 150 to the proactive response module 154, which generates one or more remediation actions 156 to apply in response to a pattern of alerts that includes the first alert followed by the one or more alerts of the alert collection 152. The generation of the one or more remediation actions 156 to apply can be based on policy information, which may be from a user, a program, or a machine. The policy information may specify that more aggressive remediation actions are to be applied under certain conditions. For example, if a pattern of alerts includes a certain number of alerts, and a first subset (less than all) of the alerts in the pattern of alerts is detected, then the policy information may specify a less aggressive remediation action to take. On the other hand, if a second subset of alerts (including more alerts than the first subset of alerts) is detected, then the policy information may specify a more aggressive remediation action to take. Examples of more or less aggressive remediation actions are provided further below.

Additionally, the proactive response module 154 can provide information of the one or more remediation actions 156 to an electronic device, including any one or more of the electronic devices 106-1 to 106-N. The information of the one or more remediation actions 156 can be applied by an electronic device in response to the electronic device detecting occurrence of the pattern of alerts in the electronic device.

Although FIG. 1 shows that the alert prediction module 150 and the proactive response module 154 are part of the central security service 102, in other examples, the alert prediction module 150 and/or the proactive response module 154 may be part of one or more of the electronic devices 106-1 to 106-N.

Each electronic device 106-*i* further includes a respective hardware processor 112-*i*, a memory 114-*i*, a storage medium 116-*i*, and a communication interface 118-*i*. The communication interface 118-*i* allows the electronic device 106-*i* to communicate over a network, such as with the central security service 102 or with another electronic device.

Programs are executed in the electronic device 106-*i* on the hardware processor 112-*i*. Although just one hardware processor is depicted in FIG. 1, the electronic device 106-*i* can include multiple hardware processors. Programs that are executable on the hardware processor 112-*i* include an operating system (OS) 120-*i*, firmware 122-*i* (e.g., Basic Input/Output System (BIOS) code), and an application program 124-*i*. Processes in the electronic device 106-*i* include processes associated with the OS 120-*i*, firmware 122-*i*, application program 124-*i*, or any other program that executes in the electronic device 106-*i*.

A hardware processor can include a microprocessor, a core of a multi-core microprocessor, a microcontroller, a programmable integrated circuit, a programmable gate array, or another hardware processing circuit. A memory can be implemented using one or more memory devices, such as dynamic random access memory (DRAM) devices, static random access memory (SRAM) devices, flash memory device, and so forth.

A storage medium can include persistent storage such as one or more disk-based storage devices, solid-state drives, and so forth. A communication interface can include a transceiver to transmit and receive signals, as well as any protocol layers (implemented with machine-readable instructions and/or hardware) to implement communication protocols associated with communications over a network.

Figure 2:
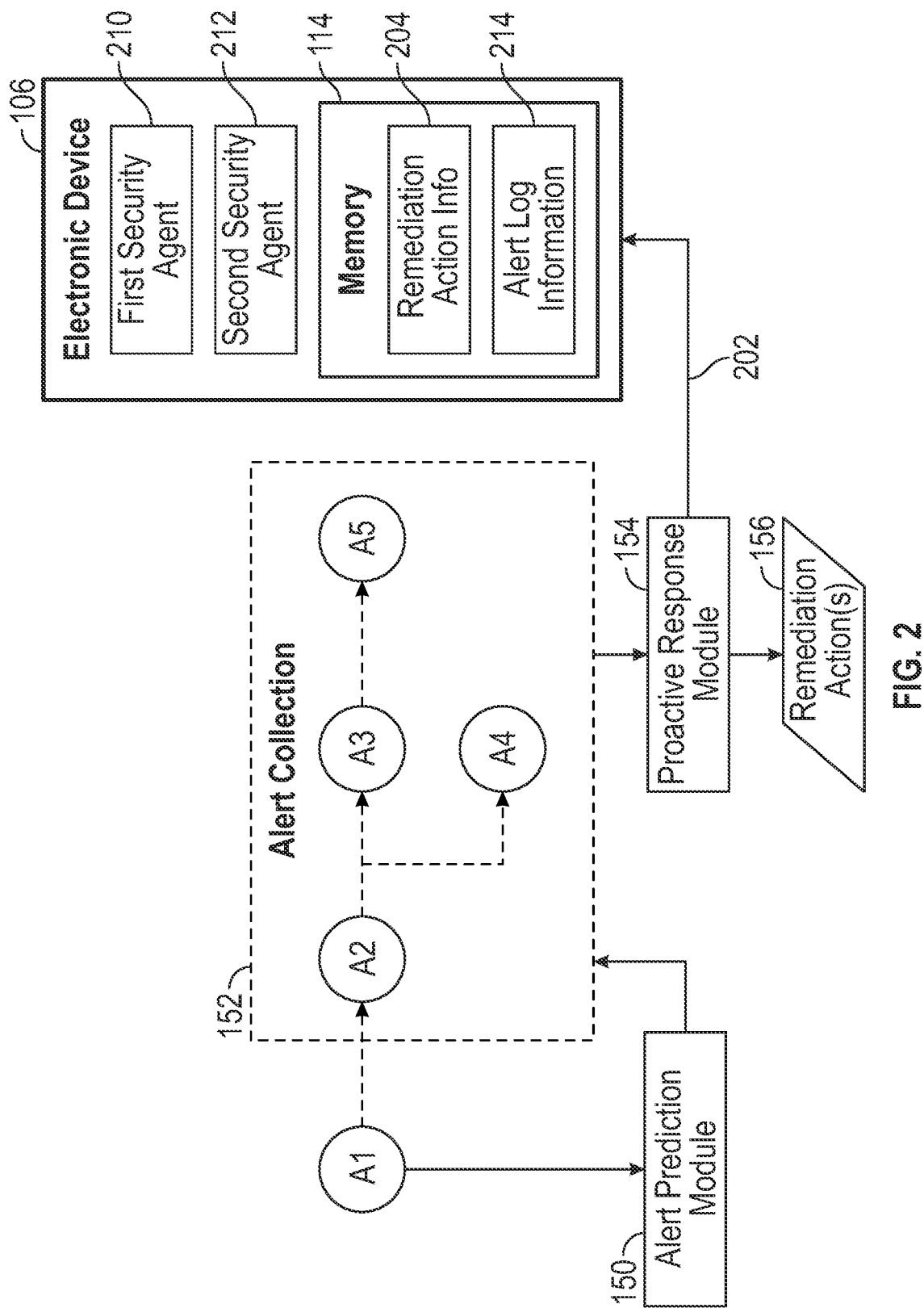
FIGS. 2-3 are graphs illustrating examples of patterns of alerts that can be predicted by a security system according to some implementations of the present disclosure.

FIG. 2 is a graph that illustrates an example of how the alert prediction module 150 generates the alert collection 152 based on a first alert A1. In the example of FIG. 2, the alert prediction module 150 predicts that an alert A2 may occur given a context that includes occurrence of the alert A1. The context can further include other contextual information, including a type of security agent that generated the alert A1, a type of electronic device in which the alert A1 occurred, a state of the electronic device, information of hardware that was operating when the alert occurred, information of one or more programs (including firmware, an OS, and/or an application program) that were executing when the alert A1 occurred, a location associated with the alert A1, a time associated with the alert A1, information of data accessed when the alert A1 occurred, the types of entities associated with the alert, reputation scores associated with entities associated with the alert, and so forth.

The prediction of an alert given a specific context, i.e., a prior occurrence of one or more alerts and other contextual information, can be a signature-based prediction or a machine learning-based prediction. An example of a signature-based prediction is a rule-based prediction, where the prediction of a subsequent alert (that has not yet actually occurred) given that one or more prior alerts have occurred is based on rule information that includes one or more rules. For example, a rule can specify that if an alert from a given type of security agent for an event that involves a specific type of program and/or a specific type of hardware, then it is likely (with a confidence measure greater than a specified threshold) that another alert will be generated where this other alert can be from the given type of security agent or another type of security agent.

Another type of signature-based prediction of alerts is based on threat intelligence. For example, threat intelligence can define a specific attack flow, which is a data model that describes the sequences of attack behaviors. A description of an attack flow can include a machine-readable representation of a sequence of actions and entities that may be involved in actions associated with an attack. The machine-readable representation can define causal relationships among actions and entities. In some examples, an attack flow can use an open source knowledgebase such as MITRE ATT&CK.

In other examples, the alert prediction module 150 uses machine learning to predict subsequent one or more alerts that may occur given the occurrence of one or more prior alerts and other contextual information. The machine learning-based prediction uses a machine learning model that can be trained using training data or using results of prior predictions and feedback regarding whether the prior predictions were accurate or not. The machine learning model can also provide a measure representing the likelihood of a predicted alert. The measure representing the likelihood of the predicted alert provides an indication of a confidence that the predicted alert will occur.

As further shown in FIG. 2, the alert prediction module 150 can predict that alerts A3 and A4 may occur (with high confidence) given a context in which alerts A1 and A2 have been detected. Additionally, the alert prediction module 150 can also predict that alert A5 may occur (with high confidence) given a context in which alerts A1 to A4 have occurred. "High confidence" may be indicated if the measure representing the likelihood of a predicted alert exceeds a specified threshold.

Collectively, the alerts A2, A3, A4, and A5 make up the alert collection 152 that is predicted by the alert prediction module 150 in response to detection of the alert A1. A "pattern of alerts" includes the alert A1 followed by one or more alerts of the predicted alert collection 152 including the alerts A2, A3, A4, and A5. This pattern of alerts may be representative of an incident relating to an attack. As examples, the pattern of alerts can be a sequence of alerts, such as any of the following: {A1, A2}, {A1, A2, A3}, {A1, A2, A4}, {A1, A2, A3, A5}, {A1, A3}, {A1, A4}, {A1, A3, A5}, {A1, A5}, or any other combination of alerts that includes A1 followed by any one or more of A2, A3, A4, or A5. Information representing the pattern of alerts can include information identifying a source of the alert (e.g., which security agent generated the alert) and a temporal relationship between the alerts (e.g., A2 follows A1, A3 and A4 follow A2, and A5 follows A3.

Given the pattern of alerts, the proactive response module 154 can generate one or more remediation actions 156 to address any or some combination of the alerts in the pattern of alerts. For example, the one or more remediation actions 156 produced by the proactive response module 154 can include remediation actions to address alerts A3, A4, and A5 (or any other subset of the pattern of alerts).

Remediation action information 202 including information of the remediation action(s) 156 and the pattern of alerts can be sent (such as over a network) by the proactive response module 154 to an electronic device 106 (or to multiple electronic devices). The electronic device saves the received remediation action information 202 (as saved remediation action information 204) in a memory 114 of the electronic device 106. The remediation action information can be in the form of a table or another type of data structure. For example, the remediation action information can include multiple entries, where each entry correlates an alert to a respective remediation action to be taken for the alert. In some cases, the entry correlates a sequence of alerts to a remediation action. Information of a pattern of alerts including alert A1 and the alerts of the alert collection 152 can also be saved in the electronic device 106, such as part of the remediation action information 204 or in a separate collection of information in the memory 114.

If the electronic device 106 detects a sequence of alerts including A1, A2, and A3 or A4, for example, then the electronic device 106 can use the remediation action information 204 to quickly determine a remediation action to address the alert A3 or A4. The remediation action information 204 can associate each alert of a pattern of alerts with corresponding remediation actions. For example, the remediation action information 204 can associate the alert A3 with remediation action R1, associate the alert A4 with remediation action R2, and associate the alert A5 with remediation action R3. Upon detecting the alert A3 after detecting the alerts A1 and A2, the electronic device 106 can access the remediation action information 204 to identify the remediation action R1 that is to be taken to address the alert A3.

The access of the remediation action information 204 in response to detecting the sequence of alerts including A1, A2, and A3 can be performed by a security agent (e.g., one of 104-1 to 104-N and 108-1 to 108-N), for example. In a specific example, a first security agent 210 produces the alert A1 and subsequently the alert A2. The occurrence of the alerts A1 and A2 (along with other contextual information) can be stored by the first security agent 210 in alert log information 214 (such as in the memory 114), for example. When a second security agent 212 (which can be different from or the same as the first security agent 210) detects the alert A3, the second security agent 212 can access the alert log information 214 to determine that the alerts A1 and A2 were previously detected. The second security agent 212 can then determine that the sequence of alerts A1, A2, and A3 matches a portion of the pattern of alerts indicated by the remediation action information 204. For example, the second security agent 212 can compare the detected alerts to the pattern of alerts including A1 and the alerts of the alert collection to determine whether the detected alerts follow a sequence that matches some portion of the alert sequence represented in the pattern of alerts. The second security agent 212 identifies, using the remediation action information 204, the remediation action R1 to apply for the alert A3 (based on the remediation action information 204 associating the alert A3 with R1). The occurrence of the alert A3 can also be stored by the second security agent 212 in the alert log information 214.

More generally, when a security agent detects a current alert, the security agent accesses the alert log information 214 to determine what previous alerts related to the given alert has occurred (e.g., the security agent detects a sequence of alerts including prior alerts and the current alert). The security agent compares the sequence of alerts (or any other collection of detected alerts) to a pattern of alerts identified by the remediation action information 204. If the sequence of alerts matches a portion of the pattern of alerts, the security agent identifies the remediation correlated by the remediation action information 204 to the current alert, and the security agent triggers the performance of the identified remediation action in the electronic device 106.

The electronic device 106 does not have to wait for a security system (e.g., a security agent) to analyze the alert and the context around the alert for producing a remediation action in reaction to the alert, which can take some amount of time that may allow for an attack to progress in the electronic device 106 and cause malfunctioning or loss/theft of data of the electronic device 106.

Figure 3:
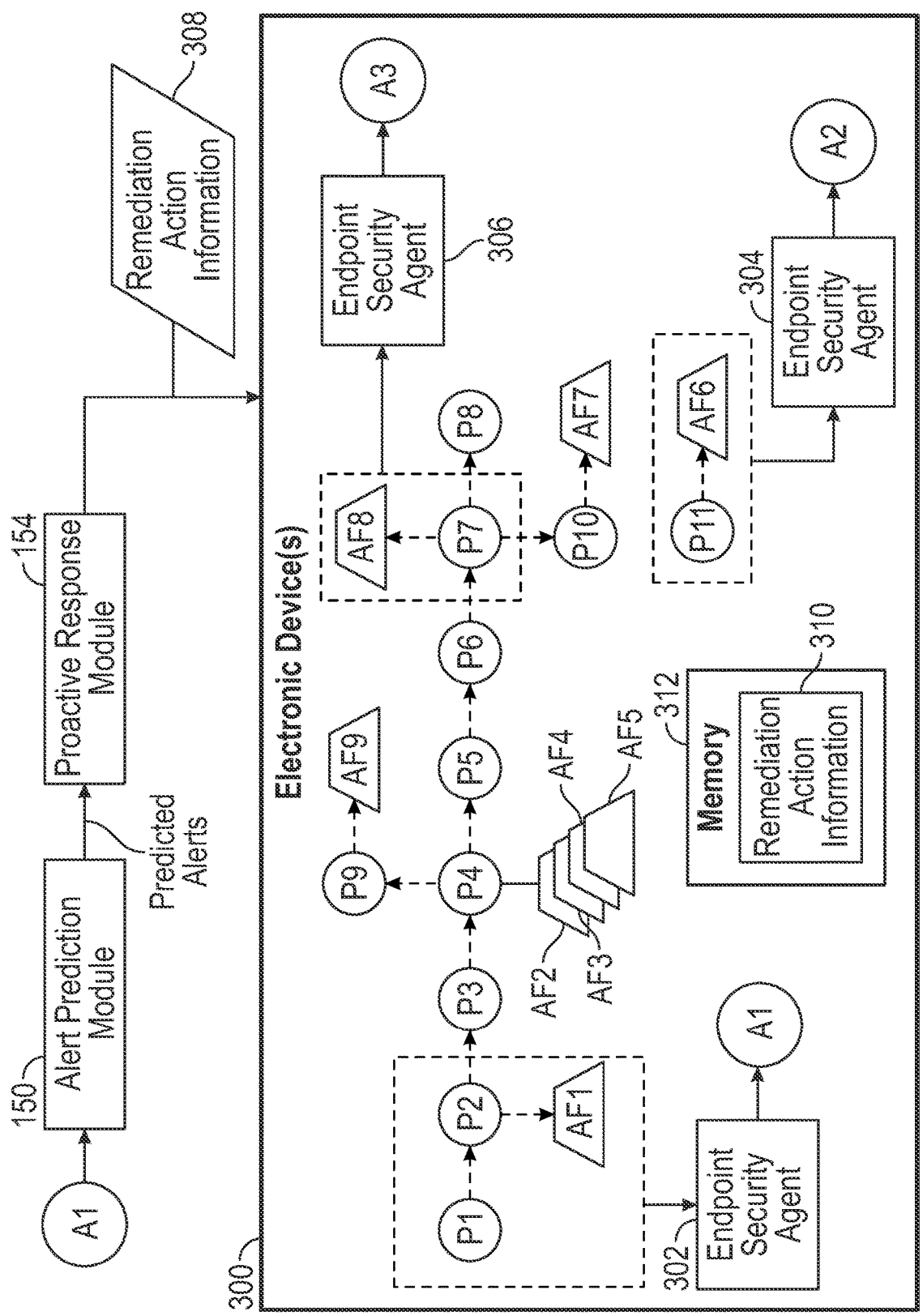

FIG. 3 is a graph that illustrates various entities involved in operations of one or more electronic devices 300, including any or some combination of the electronic devices 106-1 to 106-N in FIG. 1. Although FIG. 3 shows operations involving processes and artifacts, it is noted that operations can involve other types of entities in other examples.

In the example of FIG. 3, a process P1 starts a process P2, which in turn creates an artifact AF1. For example, the process P1 can issue a command to start the process P2. The artifact AF1 created by the process P2 can be a file, for example.

An endpoint security agent 302 (any one of the endpoint security agents 104-1 to 104-N) may issue an alert A1 based on contextual information which indicates that the process P2 (started by P1) creating the artifact AF1 according to a security alert criterion. For example, the security alert criterion may specify that a process of a particular type of program started by a process of another type of program should not be creating the type of artifact corresponding to AF1.

As further shown in the example of FIG. 3, the process P2 starts a process P3, which in turn starts a process P4. The process P4 starts a process P5 and a process P9. In addition, the process P4 creates artifacts AF2, AF3, AF4, and AF5. The process P5 starts a process P6, which starts a process P7. The process P7 starts processes P8 and P10.

The process P9 creates an artifact AF9, the process P7 creates an artifact AF8, and the process P10 creates an artifact AF7. As further shown in FIG. 3, a process P11 that does not have any direct relationship with any of the processes P1 to P10 also creates an artifact AF6. A first process is not directly related to a second process if the first process was not started or modified by the second process, or vice versa.

Given the alert A1, the alert prediction module 150 predicts that alerts A2 and A3 may be generated (with high confidence) at a future point in time. For example, the alert A2 may be generated by an endpoint security agent 304 in response to the detecting that process P11 has created the artifact AF6 and based on the alert A1 having previously been detected. The endpoint security agent 304 may be the same as or different from the endpoint security agent 302. Additionally, the alert A3 may be generated by an endpoint security agent 306 in response to detecting that process P7 created the artifact AF8 and based on the alerts A1 and A2 having previously been detected. The endpoint security agent 306 may be the same as or different from each of the endpoint security agents 302 and 304. In some examples, the endpoint security agents 302, 304, and 306 may be different types of security agents.

In response to the pattern of alerts including A1, A2, and A3, the proactive response module 154 can send, to the one or more electronic devices 300, remediation action information 308 specifying one or more remediation actions to apply. The remediation action information 308 can be stored as remediation action information 310 in a memory 312 in the one or more electronic devices 300. In examples where multiple electronic devices are involved, the memory 312 includes memory devices in the multiple electronic devices. In such examples, the proactive response module 154 sends the remediation action information 308 to the multiple electronic devices for storage in respective memory devices.

When the endpoint security agent 304 detects the alert A2, based on the alert A2 occurred after the alert A1, the endpoint security agent 304 can access the remediation action information 310 in the memory 312 to determine whether information for the alert A2 is present in the remediation action information 310. If so, the endpoint security agent 304 can identify the remediation action specified in the remediation action information 310 to take for the alert A2. The endpoint security agent 304 then triggers the application of the identified remediation action, which can be performed more quickly than if the security agent 304 had to perform an analysis of the alert A2, possibly by consulting with the central security service 102 (FIG. 1), for determining what if any remediation action is to be applied.

At a later time, when the endpoint security agent 306 generates the alert A3, based on the alert A3 occurred after the alerts A1 and A2, the endpoint security agent 306 can similarly consult the information of remediation action information 310 in the memory 312 to identify what remediation action to apply.

Note that the endpoint security agent 304 can apply a first remediation action responsive to a detection of the alert A1 and the alert A2 but without a detection of the alert A3. The endpoint security agent 306 can apply a second remediation action responsive to a detection of the alerts A1, A2, and A3. In some examples, the first remediation action is less aggressive than the second remediation action. The first remediation action is less aggressive than the second remediation action if the first remediation action causes less disruption than the second remediation action in one or more electronic devices.

Remediation actions can be applied with respect to different entities. For example, a remediation action for a process can include a terminate action, which stops execution of the process and tears down the process so that the process cannot restart again. Another remediation action for a process can include pausing the process. Terminating a process is more aggressive (and thus disruptive) than pausing the process, since a paused process can be restarted with less overhead then restarting a process that was previously terminated. For example, context information for a paused process may remain in a memory so that the context information can be used when the paused process is restarted, while context information for a terminated process may be deleted from the memory.

A remediation action for an artifact such as a file can be any or some combination of the following: delete (to remove the artifact from a storage), quarantine (to place the artifact in an isolated location to prevent access of the artifact and to prevent the artifact from triggering any activity), rollback (to place the artifact in a prior state, such as to revert a version of a file to a prior version), add to watchlist (to place the artifact on a list that is to be monitored), and so forth. Adding an artifact to a watchlist is less aggressive than deleting the artifact.

A remediation action for a resource such as a website, a domain, etc., can be any or some combination of the following: terminate a connection to the resource, block the resource, block an IP address associated with the resource, add the resource to a watchlist, and so forth. Similarly, adding the resource to the watchlist is less aggressive than other actions that can disrupt operations of the resource.

A remediation action for configuration information (e.g., a registry or registry entry) is to revert the configuration information from a current state to a prior state, or to delete the configuration information. Reverting the configuration information to a prior state is less aggressive than deleting the configuration information.

A remediation action for a user is to block the user from accessing an electronic device or a network, such as by invalidating credentials for the user or locking a user account, or to temporarily suspend processing of requests from the user. Temporarily suspending the processing of requests from the user is less aggressive than invalidating the credentials of the user.

In further examples, during operation of the one or more electronic devices 300, the alert A1 may be generated by the endpoint security agent 302, and the alert A3 may be generated by the endpoint security agent 306. However, the alert A2 was not generated by the endpoint security agent 304. In such a scenario, the endpoint security agent 306 may still apply a remediation action, but the remediation action specified by the remediation action information 310 in the scenario where the intermediate alert A2 was skipped may be less aggressive than a remediation action in the scenario where all three alerts A1, A2, and A3 were detected.

Figure 4:
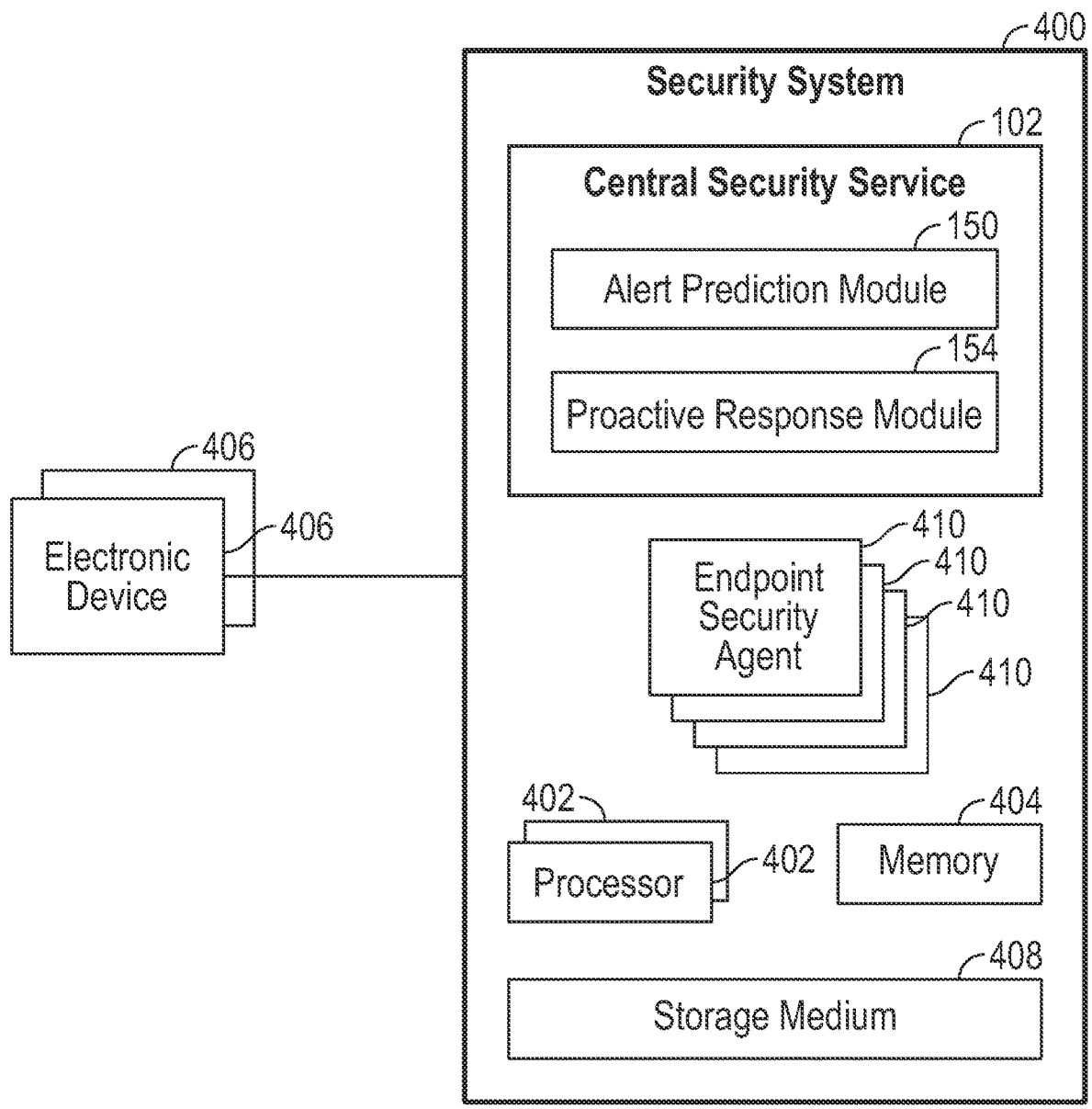
FIG. 4 is a block diagram of a security system according to some examples.

FIG. 4 is a block diagram of an example arrangement that includes a security system 400 for protecting electronic devices 406 (e.g., electronic devices 106-1 to 106-N in FIG. 1). The security system 400 includes the central security service 102 (which includes the alert prediction module 150 and the proactive response module 154) and endpoint security agents 410 (e.g., 104-1 to 104-N and 108-1 to 108-N executed in electronic devices as shown in FIG. 1).

The security system 400 includes one or more hardware processors 402 and a memory 404. The central security service 102 and the endpoint security agents 410 are executable on the one or more hardware processors 402. Note that the endpoint security agents 410 are executable on one or more hardware processors in electronic devices 406, and the central security service 102 is executable on one or more hardware processors in a computer (or collection of computers) separate from the electronic devices 406. Machine-readable instructions of the central security service 102 and the endpoint security agents 410 can be stored in a non-transitory machine-readable or computer-readable storage medium 408, and the machine-readable instructions can be retrieved from the storage medium 408 for execution on the one or more hardware processors 402.

In some examples, the machine-readable instructions of the security system 400 are executable to detect a first alert associated with activities of a first group of entities, the first alert generated by a first type of security agent. A group of entities is "associated with" an alert if activities involving the group of entities led a security system to issue the alert. An alert provides an indication that an issue has been detected that potentially may be indicative of an attack occurring in one or more electronic devices.

The machine-readable instructions of the security system 400 further predict an alert collection (e.g., 152 in FIG. 1) including one or more alerts expected to occur based on occurrence of the first alert. At least a second alert of the alert collection is from a second type of security agent different from the first type of security agent.

The machine-readable instructions of the security system 400 further generate one or more remediation actions (e.g., 156 in FIG. 1) to apply in response to a pattern of alerts including the first alert followed by the one or more alerts of the alert collection. A first remediation action can be applied by the second type of security agent to address the second alert in response to detecting that the second alert is part of the pattern of alerts.

The machine-readable instructions of the security system 400 further provide, in an electronic device to be protected against attacks, information of the one or more remediation actions to be applied by the electronic device responsive to occurrence of the pattern of alerts.

In some examples, a third alert of the alert collection is from a third type of security agent different from each of the first and second types of security agents. The third type of security agent in the electronic device applies a second remediation action responsive to a detection of occurrences of the first alert and the third alert.

In further examples, the second type of security agent in the electronic device is to apply the first remediation action responsive to a detection of a specific sequence of occurrences of alerts in the following order: the first alert, the third alert, and the second alert.

In further examples, the second type of security agent applies a second remediation action responsive to a detection of the first alert and the second alert but without a detection of the third alert. In such further examples, the second remediation action is less aggressive than the first remediation action because the third alert was skipped.

In some examples, a first security agent of one of the first and second types of security agents runs in a first electronic device, and a second security agent of the other one of the first and second types of security agents runs outside the first electronic device (e.g., in a second electronic device or in a central cloud service).

The machine-readable instructions of the security system 400 may be part of a central security service (e.g., 102 in FIG. 1) and/or may be part of one or more electronic devices 406.

Figure 5:
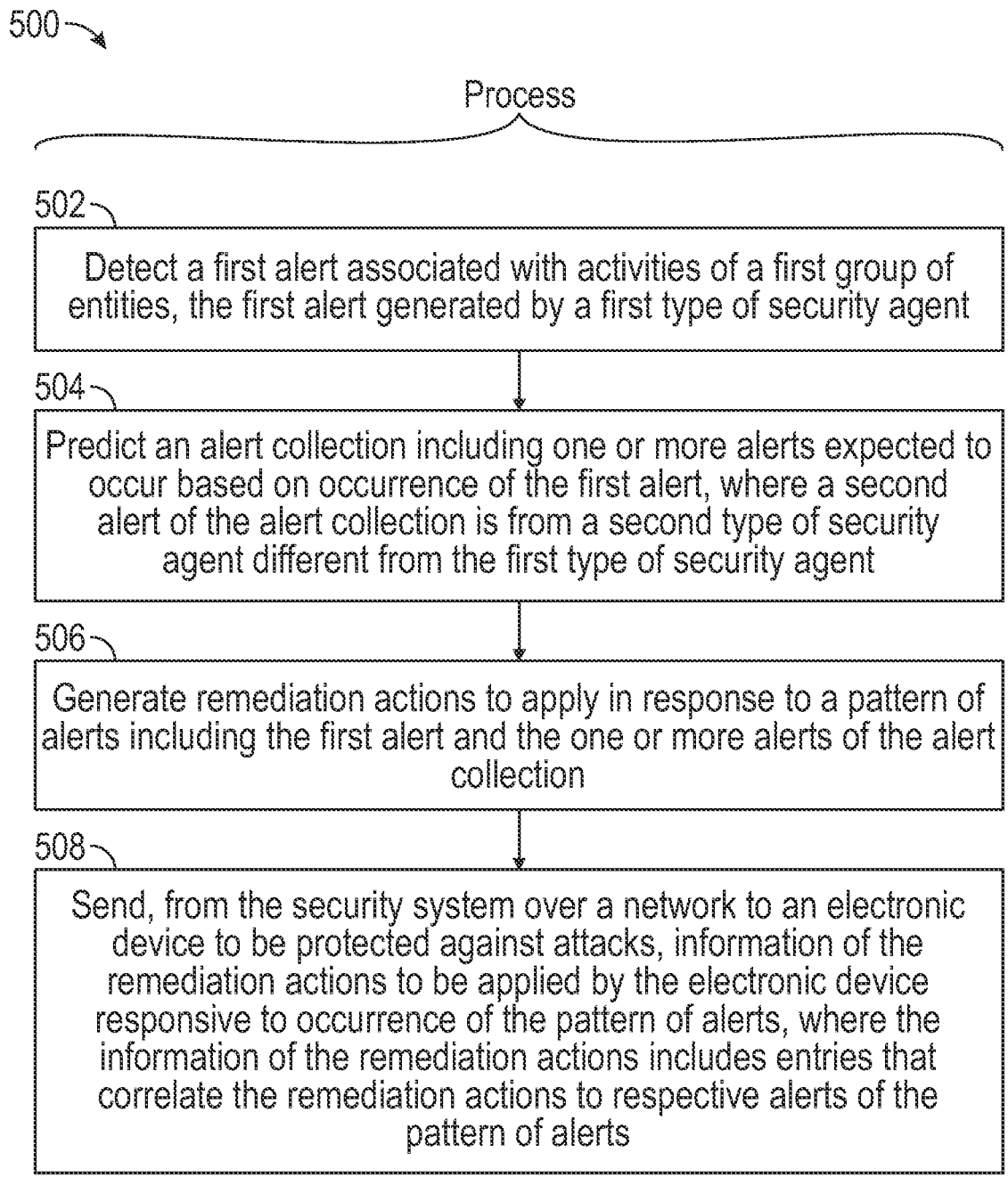
FIG. 5 is a flow diagram of a process according to some examples.

FIG. 5 is a flow diagram of a process 500 performed by a security system (e.g., 400 in FIG. 4) according to some examples. The process 500 includes detecting (at 502) a first alert associated with activities of a first group of entities, the first alert generated by a first type of security agent.

The process 500 includes predicting (at 504) an alert collection including one or more alerts expected to occur based on occurrence of the first alert, where a second alert of the alert collection is from a second type of security agent different from the first type of security agent.

The process 500 includes generating (at 506) remediation actions to apply in response to a pattern of alerts including the first alert and the one or more alerts of the alert collection. The process 500 includes sending (at 508), from the security system over a network to an electronic device to be protected against attacks, information of the remediation actions to be applied by the electronic device responsive to occurrence of the pattern of alerts, where the information of the remediation actions comprises entries that correlate the remediation actions to respective alerts of the pattern of alerts.

A storage medium (e.g. 408 in FIG. 4) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory or other type of non-volatile memory device; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium storing machine-readable instructions that upon execution cause a system to:
   detect a first alert associated with activities of a first group of entities, the first alert generated by a first type of security agent;
   predict an alert collection including a plurality of alerts expected to occur based on occurrence of the first alert and based on contextual information for the first alert, the contextual information comprising information of the first type of security agent that generated the first alert, wherein a second alert of the alert collection is from a second type of security agent different from the first type of security agent;
   generate a plurality of remediation actions to apply in response to a pattern of alerts including the first alert and the plurality of alerts of the alert collection;
   generate remediation action information comprising entries that correlate respective alerts of the pattern of alerts to respective remediation actions of the plurality of remediation actions, the remediation action information further identifying a sequence of the first alert and the plurality of alerts that are part of the pattern of alerts; and
   provide, in an electronic device to be protected against attacks, the remediation action information that identifies the sequence and that comprises the entries, wherein one or more of the plurality of remediation actions are to be applied by the electronic device responsive to occurrence of the pattern of alerts.

2. The non-transitory machine-readable storage medium of claim 1, wherein a first remediation action of the plurality of remediation actions is to be applied by the second type of security agent in the electronic device to address the second alert, wherein information of the first remediation action and the second alert is included in a first entry of the entries of the remediation action information.

3. The non-transitory machine-readable storage medium of claim 2, wherein a third alert of the alert collection is from a third type of security agent different from each of the first and second types of security agents.

4. The non-transitory machine-readable storage medium of claim 3, wherein the third type of security agent in the electronic device is to apply a second remediation action responsive to a detection of occurrences of the first alert and the third alert, wherein information of the second remediation action and the third alert is included in a second entry of the entries of the remediation action information.

5. The non-transitory machine-readable storage medium of claim 3, wherein the second type of security agent in the electronic device is to apply the first remediation action responsive to a detection of a specific sequence of occurrences of alerts in the following order: the first alert, the third alert, and the second alert.

6. The non-transitory machine-readable storage medium of claim 5, wherein the second type of security agent in the electronic device is to apply a second remediation action responsive to a detection of the first alert and the second alert but without a detection of the third alert, wherein the second remediation action is less aggressive than the first remediation action.

7. The non-transitory machine-readable storage medium of claim 2, wherein a third alert of the alert collection is from a third type of security agent different from each of the first and second types of security agents, and wherein the machine-readable instructions upon execution cause the system to:
provide, in a further electronic device to be protected against attacks, the remediation actions information that identifies the sequence and that comprises the entries, wherein one or more of the plurality of remediation actions are to be applied by the further electronic device responsive to occurrence of the pattern of alerts,
wherein a second remediation action of the plurality of remediation actions is to be applied by the third type of security agent in the further electronic device to address the third alert.

8. The non-transitory machine-readable storage medium of claim 1, wherein a first security agent of one of the first and second types of security agents runs in the electronic device, and a second security agent of another one of the first and second types of security agents runs outside the electronic device.

9. The non-transitory machine-readable storage medium of claim 8, wherein the second security agent is part of a central security service or is part of another electronic device.

10. The non-transitory machine-readable storage medium of claim 8, wherein the machine-readable instructions upon execution cause the system to:
responsive to detection of the second alert in the electronic device:
compare detected alerts including the first alert and the second alert to the sequence as identified by the remediation action information, and
based determining from the comparing that the detected alerts follow at least a subset of the sequence, access an entry of the remediation action information corresponding to the second alert and initiate a remediation action specified by the accessed entry.

11. The non-transitory machine-readable storage medium of claim 1, wherein the predicting of the alert collection including the plurality of alerts expected to occur based on the occurrence of the first alert is performed using a machine learning model or using a signature-based prediction.

12. The non-transitory machine-readable storage medium of claim 1, wherein the contextual information based on which the alert collection is predicted further comprises information of one or more of hardware that was operating when the first alert occurred, or a program that was executing when the first alert occurred.

13. The non-transitory machine-readable storage medium of claim 1, wherein the machine-readable instructions are executable in the electronic device or by a central security service separate from the electronic device.

14. The non-transitory machine-readable storage medium of claim 1, wherein the entries of the remediation action information comprise:
a first entry that correlates the first alert to a first remediation action, and
a second entry that correlates the second alert to a second remediation action.

15. A security system comprising:
one or more processors; and
a non-transitory storage medium storing instructions executable on the one or more processors to:
detect a first alert associated with activities of a first group of entities, the first alert generated by a first type of security agent;
predict an alert collection including a plurality of alerts expected to occur based on occurrence of the first alert and based on contextual information for the first alert, the contextual information comprising information of the first type of security agent that generated the first alert, wherein a second alert of the alert collection is from a second type of security agent different from the first type of security agent;
generate a plurality of remediation actions to apply in response to a pattern of alerts including the first alert and the plurality of alerts of the alert collection;
generate remediation action information comprising entries that correlate respective alerts of the pattern of alerts to respective remediation actions of the plurality of remediation actions, the remediation action information further identifying a sequence of the first alert and the plurality of alerts that are part of the pattern of alerts; and
provide, in an electronic device to be protected against attacks, the remediation action information that identifies the sequence and that comprises the entries, wherein one or more of the plurality of remediation actions are to be applied by the electronic device responsive to occurrence of the pattern of alerts.

16. The security system of claim 15, wherein the remediation action information specifies that a first remediation action to be applied in response to detecting a first subset of alerts of the pattern of alerts is less aggressive than a second subset of alerts of the pattern of alerts, wherein the second subset of alerts comprises more alerts than the first subset of alerts.

17. The security system of claim 15, wherein the entries of the remediation action information comprise:
a first entry that correlates the first alert to a first remediation action, and
a second entry that correlates the second alert to a second remediation action.

18. The security system of claim 15, wherein the contextual information based on which the alert collection is predicted further comprises information of one or more of hardware that was operating when the first alert occurred, or a program that was executing when the first alert occurred.

19. A method comprising:
detecting, by a security system comprising a hardware processor, a first alert associated with activities of a first group of entities, the first alert generated by a first type of security agent;
predicting, by the security system, an alert collection including a plurality of alerts expected to occur based on occurrence of the first alert and based on contextual information for the first alert, the contextual information comprising information of the first type of security agent that generated the first alert, wherein a second alert of the alert collection is from a second type of security agent different from the first type of security agent;

generating a plurality of remediation actions to apply in response to a pattern of alerts including the first alert and the plurality of alerts of the alert collection;

generating, by the security system, remediation action information comprising entries that correlate respective alerts of the pattern of alerts to respective remediation actions of the plurality of remediation actions, the remediation action information further identifying a sequence of the first alert and the plurality of alerts that are part of the pattern of alerts;

sending, from the security system over a network to an electronic device to be protected against attacks, the remediation action information that identifies the sequence and that comprises the entries, wherein one or more of the plurality of remediation actions are to be applied by the electronic device responsive to occurrence of the pattern of alerts; and responsive to detection of the second alert in the electronic device:
comparing detected alerts including the first alert and the second alert to the sequence as identified by the remediation action information, and
based determining from the comparing that the detected alerts follow at least a subset of the sequence, accessing an entry of the remediation action information corresponding to the second alert and initiating a remediation action specified by the accessed entry in the electronic device.

20. The method of claim 19, wherein the contextual information based on which the alert collection is predicted further comprises information of one or more of hardware that was operating when the first alert occurred, or a program that was executing when the first alert occurred.

* * * * *